United States Patent
Gadir

(10) Patent No.: US 8,336,056 B1
(45) Date of Patent: Dec. 18, 2012

(54) MULTI-THREADED SYSTEM FOR DATA MANAGEMENT

(76) Inventor: Omar M. A. Gadir, Sunnyvale, CA (US)

( * ) Notice: Subject to any disclaimer, the term of this patent is extended or adjusted under 35 U.S.C. 154(b) by 447 days.

(21) Appl. No.: 12/655,048

(22) Filed: Dec. 22, 2009

(51) Int. Cl.
*G06F 9/46* (2006.01)
(52) U.S. Cl. .................... 718/104; 718/100; 718/105
(58) Field of Classification Search ............. 718/100, 718/104, 105
See application file for complete search history.

(56) References Cited

U.S. PATENT DOCUMENTS

| | | | |
|---|---|---|---|
| 5,590,326 A | | 12/1996 | Manabe |
| 6,389,446 B1 | | 5/2002 | Torii |
| 6,725,448 B1 | | 4/2004 | Moriya et al. |
| 7,137,115 B2 | | 11/2006 | Sakamoto et al. |
| 7,243,345 B2 | | 7/2007 | Ohsawa et al. |
| 7,971,026 B2 | * | 6/2011 | Nishida et al. .............. 711/203 |
| 8,023,562 B2 | * | 9/2011 | Zheludkov et al. ...... 375/240.16 |
| 2006/0229861 A1 | * | 10/2006 | Tatsuoka et al. ............... 703/21 |
| 2006/0287106 A1 | | 12/2006 | Jensen |
| 2007/0019636 A1 | | 1/2007 | Lau et al. |
| 2007/0067771 A1 | | 3/2007 | Kulbak et al. |
| 2008/0120592 A1 | | 5/2008 | Tanguay et al. |

OTHER PUBLICATIONS

How to Survive the Multicore Software Revolution (e-Book), http://www.cilk.com/ebook/download5643.
Professional Multicore Programming: Design and Implementation for C++ Developers, Cameron Hughes, 2008.
The Multi-Core Dilemma, http://www.theserverside.com/news/thread.tss?thread_id=44656.
Multithreaded Technology & Multicore Processors http://info.danysoft.com/free/inteldrdobbs.pdf.
Sun, IBM take processors multithreaded, multicore http://www.eetimes.com/story/OEG20030228S0017.
Multithreaded, Multi-core Processors: Hey, Where Are the Programs? http://www.clabbyanalytics.com/uploads/RapidMind_2008_-_Final.pdf.

* cited by examiner

*Primary Examiner* — Thomas Lee
*Assistant Examiner* — Robert Cassity

(57) ABSTRACT

A multi-threaded system for data management and other computationally intensive applications. The invention takes advantage of multi-core processors to attain high performance. Multi-core processors provide high performance by executing programs in parallel. The amount of performance gained is strongly dependent on the software implementation. To take advantage of the multi-core architecture, applications should be multi-threaded. The invention provides a uniform, configurable, and a consistent multi-threaded software structure that increases performance by distribution of tasks and workload between threads and allocating threads to different processing units, so as to run programs in parallel. The uniform structure of the threads, the ease of configuring the software, and its modularity simplify execution of complex projects and expedite application development.

20 Claims, 10 Drawing Sheets

1- Information extracted from the configuration file.
2- Queue ID for incoming messages.
3- Queue ID for synchronous mode of communication.
4- A hash table.
5- Thread type.
6- A message buffer.
7- A pointer to message to be sent.

FIG. 2

1- Number of worker threads.
2- Worker threads name prefix.
3- A worker thread priority.
4- A worker thread start routine.
5- A worker thread affinity.
6- Worker threads synchronization method.

FIG. 3

1- Name of the thread which is the source of the message.
2- Name of the thread which is the destination of the message.
3- Message queue ID for synchronous communication.
4- A command.
5- The command options.
6- The command arguments.

FIG. 4

MULTI-THREADED SYSTEM FOR DATA MANAGEMENT

BACKGROUND OF THE INVENTION

The invention relates to a multi-threaded system for computationally intensive data management applications.

In a multi-processor system, two or more instruction processors (generally referred to as CPUs) work together to process programs simultaneously. Symmetric multiprocessing or SMP involves a multiprocessor computer architecture where two or more identical processors can connect to a single shared main memory. SMP is the standard processing model that exists in personal computers.

A multi-core processor is an integrated circuit to which two or more processors have been attached for enhanced performance, reduced power consumption, and more efficient simultaneous processing of multiple tasks. Multi-core processing is a growing industry trend as single core processors rapidly reach the physical limits of possible complexity and speed. Companies that have produced multi-core products include Intel, AMD, ARM, Broadcom, and other chip makers. Multi-core processors are widely used across many application domains including: general-purpose, data mining, Web applications, mathematical analysis, embedded applications, network, digital signal processing, and graphics. Current operating systems such as Microsoft Windows, Linux, Solaris, and FreeBSD are now capable of benefiting from multi-core processors.

The amount of performance gained by the use of a multi-core processor is strongly dependent on the software algorithms and implementation. In particular, the possible gains are limited by the fraction of the software that can be parallelized to run on multiple cores simultaneously; this effect is described by Amdahl's law.

Software can be run in parallel by dividing a large problem into smaller ones, which are then solved concurrently in parallel. The software that addresses the smaller problems can be a process or a thread. Both processes and threads are methods of parallelizing an application. However, processes are independent execution units that contain their own state information, use their own address spaces, and only interact with each other via interprocess communication mechanisms, generally managed by the operating system.

By contrast, a thread is a coding construct. A single process might contain multiple threads; all threads within a process share the same state and same memory space. Threads can communicate with each other directly, because they share the same variables, as well as via interprocess communication mechanisms. A thread is much quicker to create. Other advantages of threads over processes are: the switching between threads is faster than between processes, and communication between them is simple and fast since they share the address space. A process or a thread can be persistent, which means it is always available, or it can be created to perform a certain task and then it dies.

Originally, in Unix creation of a process is based on two system calls fork( ) and exec( ). The system call fork( ) creates a copy of the process that invokes it. The process image is identical to that of the calling process, sometimes referred to as the parent process, except for a few parameters like process identifier (PID). The system call fork( ) creates a process but is not enough to run a new program. To do that, the forked child needs to overwrite its own image with the code and data of the new program. This is done by exec( ).

Operating systems provide proprietary thread implementations. Known proprietary thread implementations are those of IBM's AIX, Sun's Solaris, Linux, and Microsoft's Windows NT systems. A portable thread implementation is provided by POSIX (Portable Operating System Interface). The POSIX.4a specification provides a set of Application Program Interfaces (APIs) that allow C programmers to include thread support in their programs. The POSIX standard was defined for the C programming language only. While efforts to define the POSIX standard for other languages are still in progress, programmers writing in other programming languages can use the POSIX standard by using wrappers around C function calls.

The promise of multi-threading is based on the opportunity to leverage multi-core computing platforms to increase performance. This is especially critical in computationally intensive applications. However, many of existing applications are not multi-core aware. Some of them extensively use fork( ) and exec( ) and have limited use of multi-threading. In addition to being slow, fork( ) and exec( ) use a great amount of resources. Limited use of threads, absence of appropriate synchronization between processes and threads, and the fact that software tasks were not designed to run in parallel make it difficult for some applications to benefit from multi-core processors.

Interprocess communication (IPC) mechanisms allow arbitrary processes and threads to exchange data and synchronize execution. IPC may also be referred to as inter-thread communication. The main IPC methods are: message queue, signals, socket, pipe, named pipe, semaphore, and shared memory. In addition to IPC, POSIX threads have the following methods for synchronization: mutual exclusion (mutex) locks, condition variables, and read-write locks. Also, POSIX threads specify a synchronization object called a barrier, along with barrier functions. The functions create the barrier, specifying the number of threads that are synchronizing on the barrier, and set up the threads to perform tasks, and wait at the barrier until all the threads reach the barrier. When the last thread arrives at the barrier, all the threads resume execution.

Other forms of IPC are message passing in Java Remote Method Invocation (RMI), Common Object Request Broker Architecture (CORBA), and others. There is also Message Passing interface (MPI), which is a library specification for message passing, proposed as a standard by a broadly based committee of vendors, implementers, and users. Java has built-in thread support for multi-threading synchronization.

In some systems a process or a thread executes a program in response to commands it receives. The command is parsed to find its associated executable program. Some applications, for instance Unix shell, use hash tables to locate an executable program. A hash table uses a hash function. A hash function executes an algorithm that takes a variable-size input, like a name, and returns a fixed-size string or an integer which is called a hash value. The hash value is used to find the item that is associated with the input. In many situations, hash tables are more efficient than search trees and many other table lookup structures.

In a multi-threaded environment, to increase performance, some recommend using processor or thread affinity to associate processes or threads with particular processor or core. This minimizes thread migration and context switching. A context switch is the computing process of storing and restoring the state, referred to as the context, of a CPU such that multiple threads and processes can share a single CPU resource. Processor or thread affinity also improves the data locality and reduces the cache-coherency traffic among processors or cores.

Current operating systems that support multi-core systems have a built-in thread affinity by giving a thread a tendency to run where it has run before, keep threads close to their parents, avoid moving threads around, keep data close to the threads that initializes it, group cores according to locality, and assign threads to less loaded cores and core groups. However, program behavior is unpredictable as it changes over time and may cause a drop in performance. For instance, data initialized at the beginning of a program by a thread, but later used by multiple threads may cause allocation of many threads to the core where data initialization took place, while other cores are less loaded. To solve such problems there is need to use thread affinity to force the execution of threads in the less loaded cores. Also, if two or more threads use the same data in memory, the threads could be mapped to the same core so that they can share the same cache. The implementation of built-in thread affinity is different for different operating systems. A multi-threaded program with threads designed to run in parallel behaves differently for different operating systems.

Computationally intensive applications can take advantage of multi-core architecture. One of those applications is data management. Technology advances decreased the cost of storage, increased the size of digital data, and increased the rate of data transfer. This resulted in applications that have to deal with voluminous data. An example of such applications is enterprise data management. Enterprise data management is the development and execution of policies, practices, and procedures that properly manage enterprise data.

Aspects of enterprise data management that are computationally challenging include discovery of data stored in an enterprise network, data categorization (sometimes referred to as classification), and applying enterprise management policies to categorized data. Some of the data discovery methods utilize Internet Protocol (IP) port scanners. IP port scanners determine services, devices available in the network, and the type of data source. Categorization of data is based on metadata or full text search. Categorization rules specify how data is classified into different groups. For instance, documents categorization could be based on who owns them, their size, and their content. Metadata consist of information that characterizes data. Sometimes it is referred to as "data about data". Data categorization methods, based on metadata, group data according to information extracted from its metadata. A few examples of such information are: the time a document was last accessed, its owner, its type and its size. Categorization based on full text search utilizes search technology. Full text search is used to identify documents that contain specific terms, phrases, or a combination of both. The result of the search is used to categorize data. In addition to categorization, enterprise data management involves formulation of policies to be applied to categorized data. For example, policies could be encrypting sensitive data, auditing data, retaining data, archiving data, deleting data, modifying data access, and modifying read and write permissions.

As technology advances, the computational requirements of data management will increase. Other applications that deal with voluminous data are: scientific research, environment, energy, and applications that include modeling and simulation.

It would thus be highly desirable to provide a general and modular multi-core aware solution to the problem of enterprise data management.

It would additionally be highly desirable if the solution could be used for other computationally intensive applications.

SUMMARY OF THE INVENTION

In general, in one aspect, the invention provides a multi-threaded system for data management and other computationally intensive applications. The threads are configured in one place, and have the same structure. The same application programming interface (API) is used for inter-thread communication. The APIs provide for both synchronous and asynchronous communications between threads. In synchronous communication the thread that sends a message waits for a response from the thread that receives the message. In asynchronous communication, the thread that sends a message does not wait for a response. The inter-thread messages could be buffered or unbuffered.

The invention utilizes POSIX threads, which are based on C programming language. Data management is broken into tasks and tasks are allocated to threads. The threads have uniform structure. The thread start routines differ only in three items: their names, the places where they wait for incoming messages, and the places where they wait for a response after sending a message during synchronized communication. The location where a thread waits for messages depends on the type of inter-thread communication selected.

In general, in another aspect of the invention, the inter-thread communication is based on Unix message queues. A thread waits for incoming messages at a message queue identifier (ID), and if communication is synchronous, waits for a response at another message queue ID.

In general, in another aspect of the invention, each thread has a name. The thread name is mapped to the thread identifier (ID), which is provided by an operating system after thread creation. The thread name is easier to remember than the thread ID, and is used to identify the thread that is the source of a message and the thread to which a message is sent. Another advantage of thread name is that, unlike thread ID, it does not change when the system is restarted.

In general, in another aspect of the invention each thread has a thread affinity to attach it to a specific processor in a multi-processor system, or to a specific core or a group of cores in a multi-core system.

In general, in another aspect of the invention, inter-thread messages include commands to be executed by the recipient of the message. When a thread received a message, it extracts the command, and locates the corresponding routine to be executed in its hash table and executes it.

In general, in another aspect of the invention each thread has a hash table installation routine that includes commands to be executed by the thread and the corresponding executable programs. When a thread is created, the hash table installation routine creates the hash table and installs in it the commands and the executable programs. Each thread owns its hash table and its hash table is not visible to other threads.

In general, in another aspect of the invention the name of a thread, its priority, thread affinity, the thread start routine, and the routine that installs its executable modules in a hash table are stored in a configuration file. The configuration file is accessed during initialization and its contents are used to create the threads.

In general, in another aspect of the invention, during system initialization a global array of thread descriptors is created. A thread descriptor is a data structure that includes information about threads. Each element of the array contains information about a thread. Some of the information is extracted from the configuration file. Some of the information is added to the thread descriptor during the creation of a thread.

In general, in another aspect of the invention, when a message is buffered, the sender of the message allocates memory, referred to as a buffer, and stores all components of the message in that buffer. The recipient of the message accesses the buffer and extracts the components of the message. In buffered messages, once a message is sent, there is no possibility of the content of the message being overwritten as only the recipient accesses the buffer. In unbuffered messages, no message buffer is allocated. Unbuffered messages are used when the possibility of the contents of the messages being overwritten is remote. This is applicable to messages containing commands that are executed before the next message is sent.

In general, in another aspect, the invention provides systems, programs, and methods where a thread creates worker threads and distributes workload between them. Worker threads execute programs in parallel so as to increase performance. The synchronization between threads uses thread synchronization methods including, but not limited to, barrier, mutual exclusion locks, condition variables, and read-write locks. The worker threads could be bound to the same processor or core where the creator of the workers is executing, or could be bound to another processor, or core, or could be bound to a set of processors or cores.

In one embodiment, the invention is used to perform enterprise data management comprising data discovery, metadata extraction, full text search, data categorization and policy management.

In general, in another aspect of the invention, the number of threads in the configuration file and the workload allocated to threads are adjusted according to the computational intensity of an application. In one case, after running the system for a while, the scope of data analysis is increased to the extent that some threads take too long to complete their tasks, even while computing resources are available. The number of threads, the workload allocated to threads, and thread affinity are modified in the configuration file so as to distribute workload evenly between computing resources.

Implementations of the invention can realize one or more of the following advantages. The system provides a multi-processor and multi-core aware thread implementation, adaptable to different computationally intensive applications. When running conditions cause imbalance in the distribution of threads and workload between different cores, the thread affinity in the configuration file could be adjusted to correct the imbalance. The uniform and consistent structure of threads simplifies execution of complex projects and expedites application development.

The details of one or more implementations of the invention are set forth in the accompanying drawings and the description below. Other features and advantages of the invention will become apparent from the description, the drawings, the claims.

BRIEF DESCRIPTION OF THE DRAWINGS

FIG. 2 is a list of the main components of the thread descriptor.

FIG. 3 is the list of parameters used for a worker thread configuration.

FIG. 4 illustrates components of an inter-thread message.

Like reference symbols in the various drawings indicate like elements.

DETAILED DESCRIPTION

Figure 1:
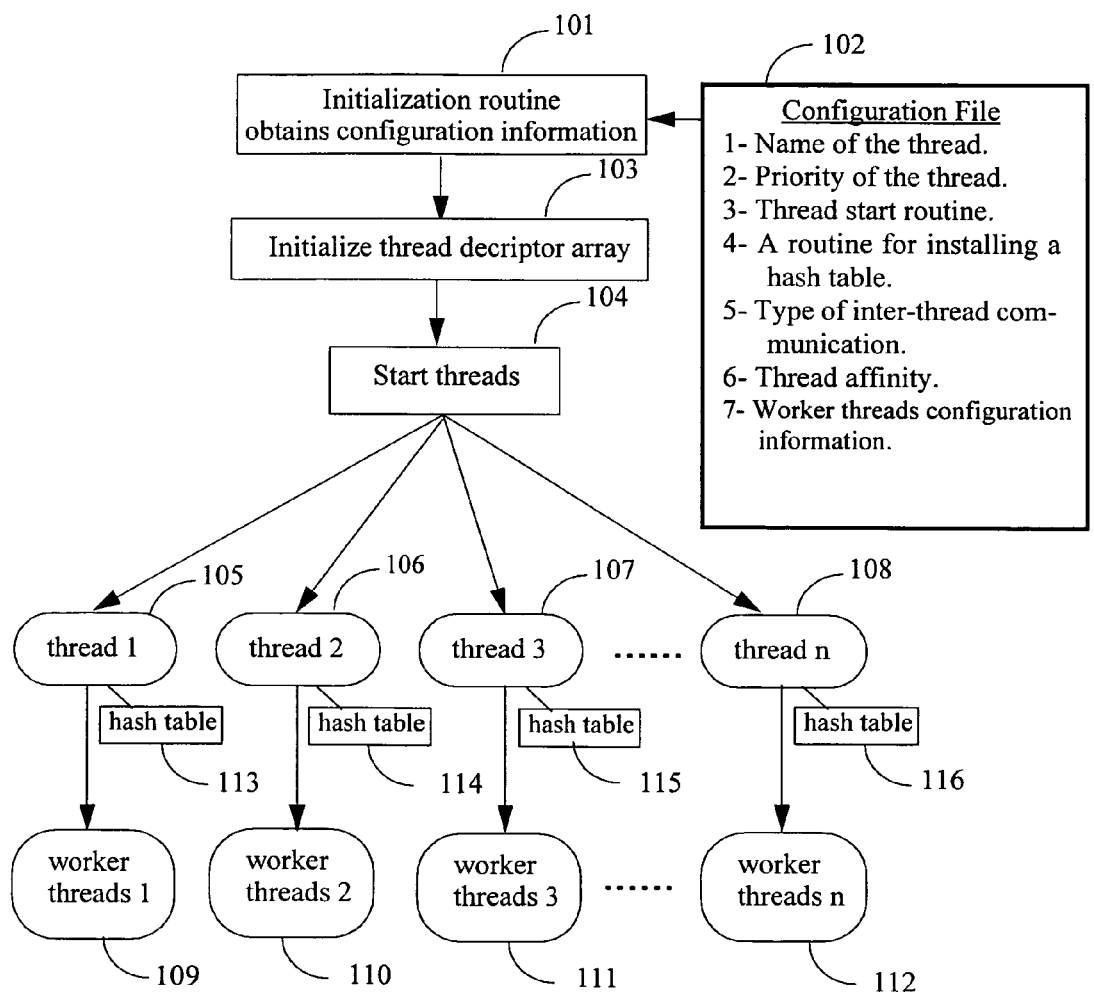
FIG. 1 is a block diagram of a multi-threaded system for data management according to one aspect of the present invention.

FIG. 1 is a block diagram of a multi-threaded system for data management and other computationally intensive applications in accordance with the invention.

During system startup the initialization routine (101) obtains information stored in a configuration file (102). The configuration file includes configuration information for threads. The data stored in the configuration file includes: the name of a thread, its priority, the thread start routine, a routine for installing a hash table, the type of inter-thread communication, thread affinity, and worker thread configuration information. The routine for installing the hash table contains the commands to be executed by a thread and the corresponding executable programs. According to a first embodiment of the current invention the type of inter-thread communication is set to Unix message queues. The programming language used is C language and thread implementation is based on POSIX.

In FIG. 1, the initialization routine initializes an array of thread descriptors (103). Items stored in each element of the array are shown in FIG. 2. Each element in the array contains information about a thread. Some of the information is extracted from the configuration file. Information extracted from the configuration file includes: the name of the thread, its priority, the thread start routine, a routine for installing a hash table, the type of inter-thread communication, the thread affinity, and worker threads configuration information. Some information is added during the creation of the thread. Added information includes: a queue ID for incoming messages, a queue ID to receive responses during synchronous communication, a hash table, thread type, a message buffer, and a pointer to a message to be sent. The hash table contains the programs that are executed by the thread that owns the hash table. Thread type indicates whether a thread is created during initialization or later while the system is running. The message buffer is used if buffered communication is selected for inter-thread communication. The pointer to the message to be sent is used during unbuffered communication. It points to the place where a thread formats a message before sending it.

In FIG. 1, after the initialization routine initializes the thread descriptor array, it starts all threads included in the thread descriptor array (104). The system creates as many threads as specified in the configuration file, each thread with its own hash table. FIG. 1 shows a system with n threads: thread 1 (105), thread 2 (106), thread 3 (107), . . . , and thread n (108). Hash table 113 is owned by thread 1 (105), hash table 114 is owned by thread 2 (106), hash table 115 is owned by thread 3 (107), . . . , and hash table 116 is owned by thread n (108). Depending on the thread affinity, threads are allocated to different processors in a multi-processor system, or to different cores or a group of cores in a multi-core system. When a workload is high, threads create worker threads that run in parallel. Unlike their parents, worker threads do not have hash tables or message queue IDs. Worker threads are allocated to the same processor or core as the parent thread, to different processors in a multi-processor system, or to different cores or a group of cores in a multi-core system. In FIG. 1 thread 1 (105) creates worker threads 1 (109), thread 2 (106)

creates worker threads 2 (110), thread 3 (107) creates worker threads 3 (111), ..., and thread n (108) creates worker threads n (112).

During the design phase a data management problem is broken into tasks and tasks are allocated to threads. A thread performs a task in response to a command it receives. The command and the program to be executed so as to perform the task, are included in a routine that installs them in a hash table. Number of workers threads created by each thread is determined based on workload of the thread. Configuration information about threads and worker threads is included in the configuration file. The design specifies threads and worker threads that run in parallel. This is attained by allocating threads and worker threads to different processing units using thread affinity in the configuration file.

FIG. 3 illustrates the configuration information used by threads when creating a group of worker threads. The configuration information includes: the number of worker threads, a name prefix of the worker threads, a worker thread priority, a worker thread start routine, a worker thread affinity, and the synchronization method between worker threads. The number of workers depends on the workload. The name prefix is attached to the thread ID to give a worker thread a unique name. The synchronization method selected could be one or a combination of the following: barrier, mutual exclusion locks, condition variables, or read-write locks.

FIG. 4 illustrates the content of messages exchanged between threads. A message includes the name of the thread which is the source of the message, the name of the thread which is the destination of the message, the message queue ID at which the thread sending the message waits for a response during synchronous communication, a command for the destination thread to execute, the command options, and the command arguments. Some commands do not have options, do not have arguments, or do not have both. Some commands have one option, one argument, or both. Messages could be synchronous or asynchronous, and buffered or unbuffered. The name of the thread that is the destination of the message ensures that only the destination thread receives the message. If the communication is synchronous, the destination knows the message queue ID at which the source of the message is waiting and sends a response to it.

Each thread stores the commands it has to execute and the corresponding executable programs in its hash table. Each thread owns its hash table and its hash table is not visible to other threads. When a thread receives a message it extracts the command included in the message, and if there are command options and command arguments, it extracts them as well. If the command exists in its hash table, it executes the corresponding executable program.

Figure 5:
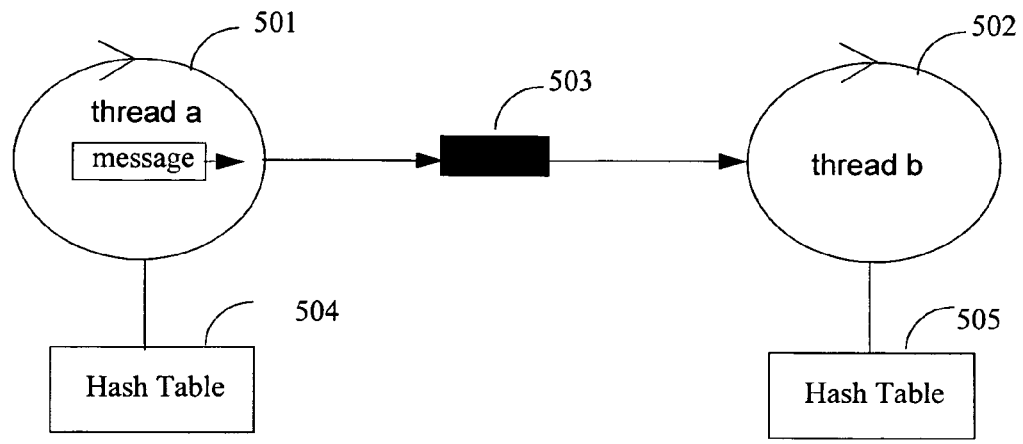
FIG. 5 illustrates inter-thread asynchronous communication.

FIG. 5 illustrates inter-thread asynchronous mode of communication. Thread a (501) formats a message and send it to a message queue (503) where thread b (502) is waiting for a message. Thread b (502) receives the message and extracts a command, its options, and its arguments. If the command exists in its hash table (505), it executes the corresponding executable program.

Figure 6:
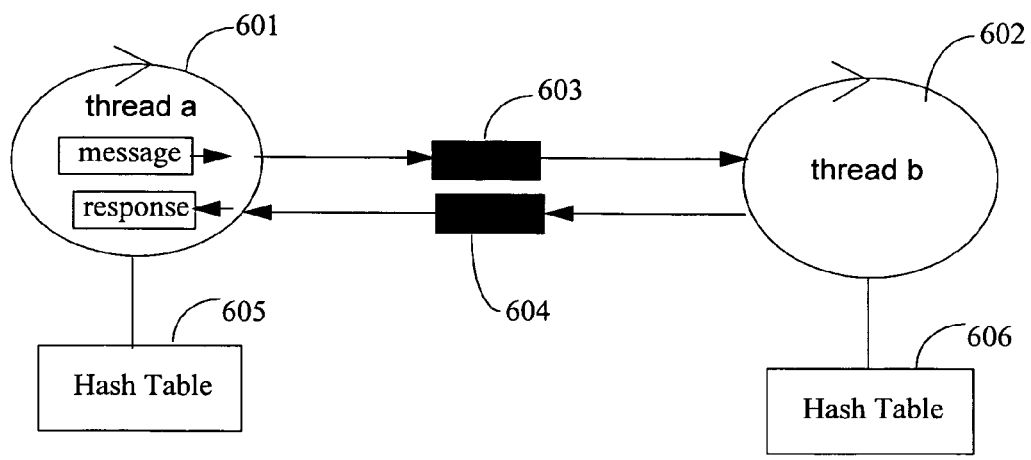
FIG. 6 illustrates inter-thread synchronous communication.

FIG. 6 illustrates synchronous communication. Here, thread a (601) formats a message and send it to a message queue (603), where thread b (602) is waiting for an incoming message. Then thread a (601) waits at message queue 604, for a response from thread b (602). Thread b (602) receives the message and extracts the command, its options, and its arguments. If the command exists in its hash table (606), it executes the corresponding executable program. Then thread b (602) sends a response related the execution of the command to message queue 604. Thread a (601) receives the response.

Figure 7:
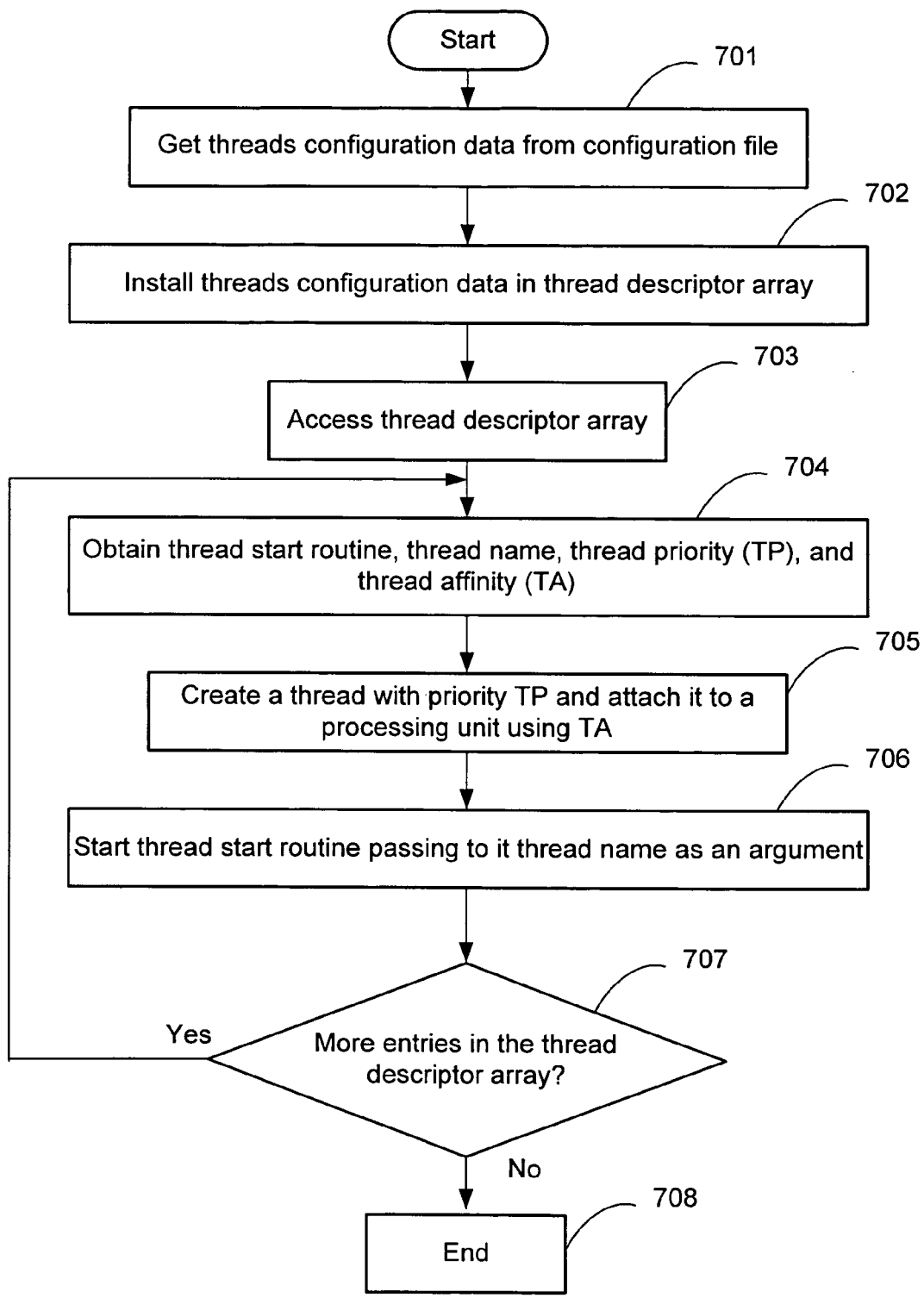
FIG. 7 is a flowchart illustrating creation of a thread.

FIG. 7 illustrates the steps executed by an initialization routine at system startup. In step 701, the initialization routine gets threads configuration data from the configuration file (102 in FIG. 1). In step 702, threads configuration data is installed in a thread descriptor array. Then the program iterates through the thread descriptor array and for each entry it creates the corresponding thread. Steps involved in creating a thread are covered in FIG. 8. In FIG. 7, in step 703, the thread descriptor array is accessed. In step 704, a thread start routine, a thread name, a thread priority (TP), and the thread affinity (TA) are obtained. In step 705, a thread with thread priority TP is created and attached to a processing unit using the thread affinity TA. The processing unit is a core or a group of cores in a multi-core system, or a processor in a multi-processor system. In step 706, the thread start routine is started, passing to it as an argument the thread name. The decision step 707 verifies whether there are more entries in the thread descriptor array. If there are more entries, the program proceeds to step 704. If decision step 707 finds all entries have been covered, program ends at step 708.

Figure 8:
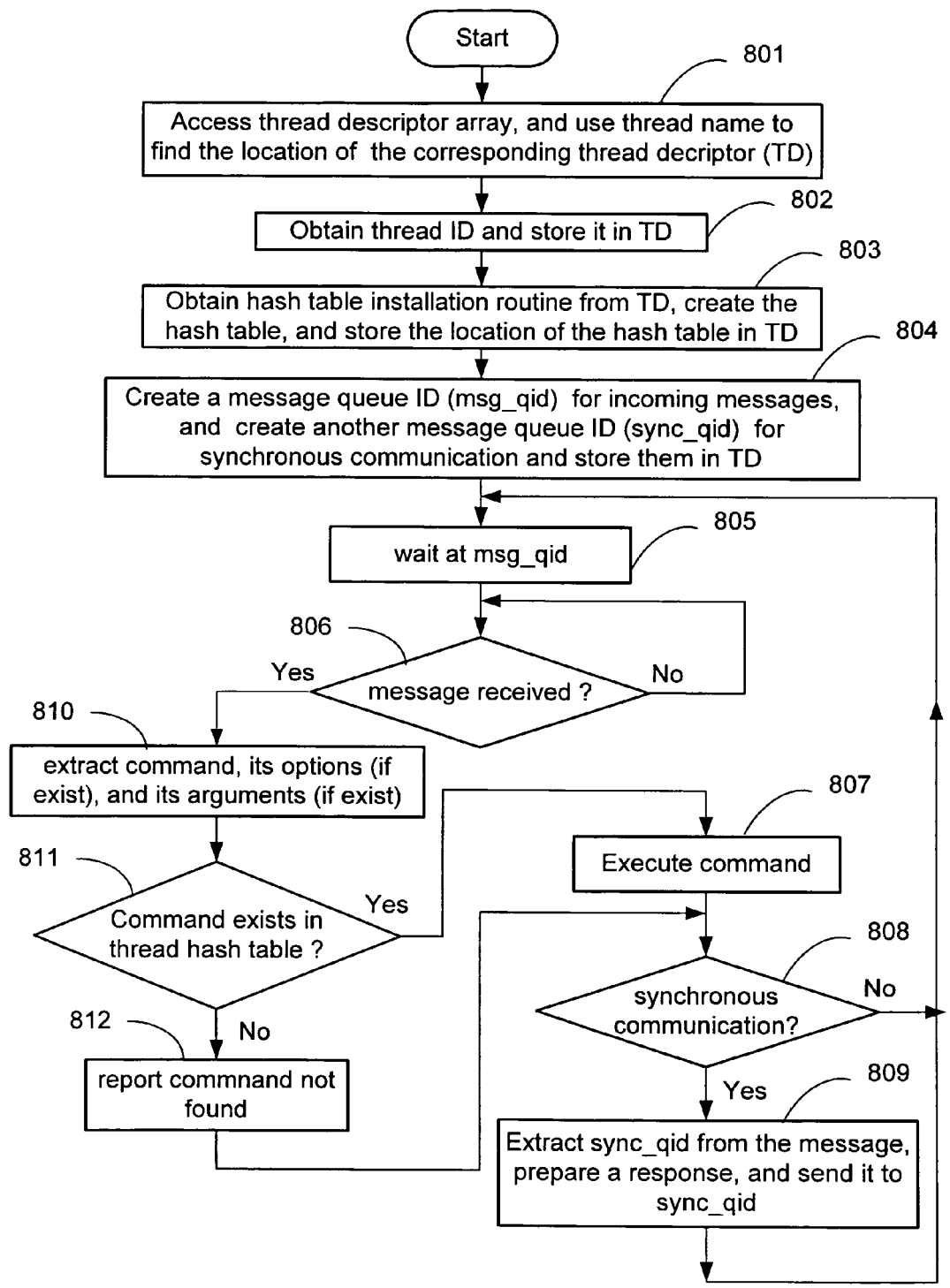
FIG. 8 is a flowchart of a thread start routine.

FIG. 8 illustrates the steps for creating and running a new thread. The steps are executed by the thread start routine. The name of a thread is passed as an argument to the thread start routine. In step 801, the thread descriptor array is accessed and the thread name is used to find the location of the corresponding thread descriptor (TD) of the thread to be created. In step 802, the thread identifier (ID) of the new thread is obtained from the operating system, which is running in the system, and is stored in the thread descriptor. In step 803, the hash table installation routine is obtained from the thread descriptor and is used to create the thread hash table. The location of the hash table is stored in the thread descriptor. In step 804, a message queue ID for incoming messages (msg_qid) and a message queue ID for synchronous communication (sync_qid) are created, and are stored in the thread descriptor. In step 805, the thread waits for incoming messages at msg_qid. In decision step 806, if no message is received, the thread continues waiting. If a message is received, then in step 810 the command is extracted from the message, and if the command options and/or command arguments exist, they are extracted as well. In decision step 811, it is verified whether the command exists in the thread hash table. If it exists, then it is executed in step 807, and execution proceeds to decision step 808. If it does not exist, the thread reports that the command does not exist (step 812) and execution proceeds to decision step 808. In decision step 808, it is verified whether the communication is synchronous or not. If it is synchronous, the sync_qid of the thread that has sent the message is extracted from message and is used to send a response related to the executing the command (step 809). After sending the response the thread waits at its msg_qid for new incoming messages (step 805). If in decision step 808 the message is not synchronous, execution proceeds to step 805.

To provide a uniform implementation of inter-thread communication, two APIs are provided: one for unbuffered communication and the other for buffered communications. For buffered communication, a buffer is allocated and the message is placed in that buffer. A pointer in the thread descriptor of the thread that is sending the message is set to point to the buffer. For unbuffered message, no buffer is allocated. A pointer in the thread descriptor of the thread that is sending the message is set to point to the message.

Both APIs for inter-thread communication accept variable number of arguments. C language allows functions to have a variable number of arguments, through the varargs language feature. The list containing the arguments is referred to as the variable argument list (VAL). To call the unbuffered or buffered function, the first argument should be the name of the thread sending the message; the second argument is the name of the thread that is the recipient of the message. This is followed by a command, its options and its arguments. The last argument to the two APIs is the mode of communication, which is either asynchronous or synchronous. The two APIs prepare a message and then call a routine for sending the message.

Figure 9:
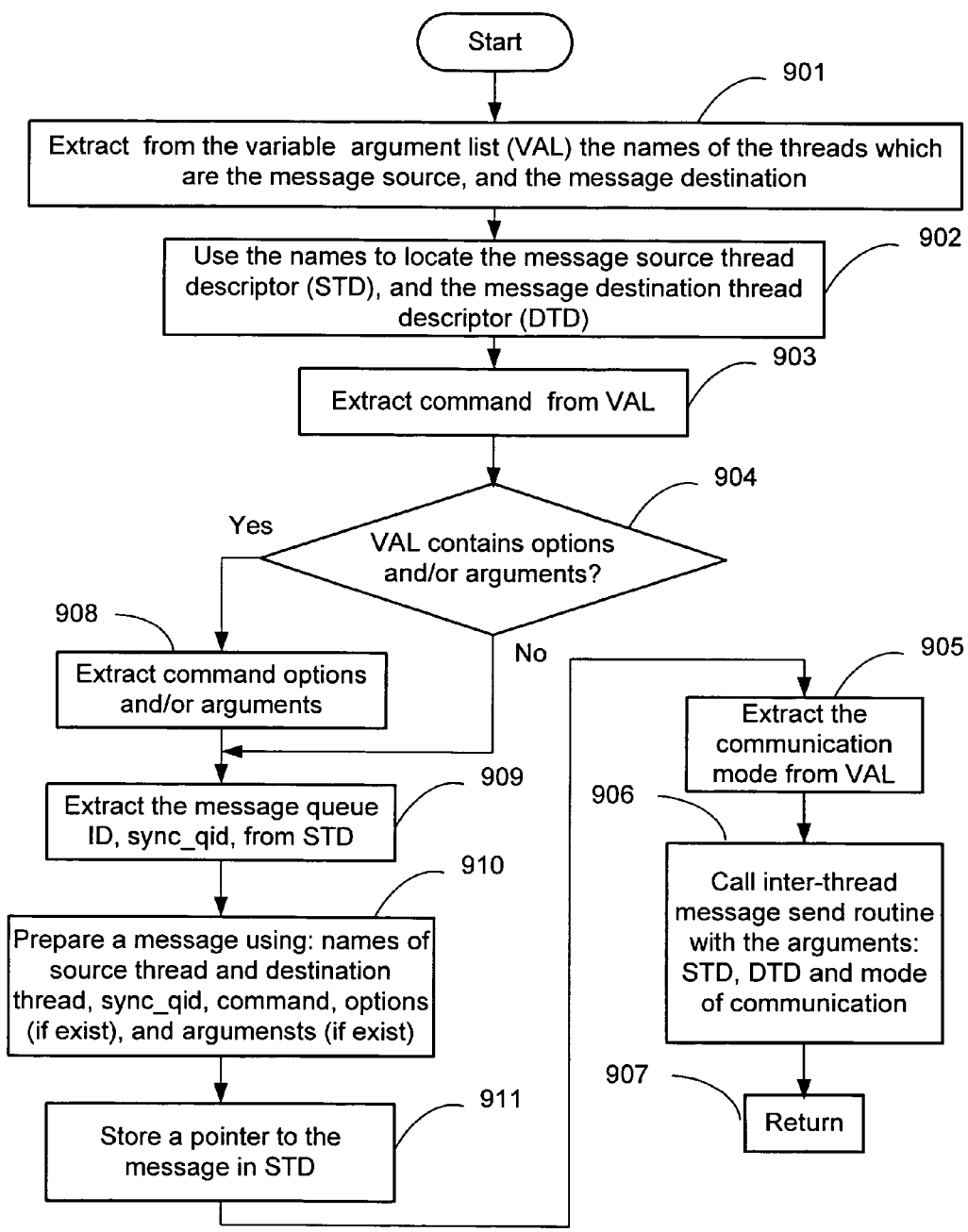
FIG. 9 is a flowchart illustrating API for unbuffered messages.

FIG. 9 illustrates the steps performed by the API for handling unbuffered messages. In step 901, the name of the thread that is the source of the message, and the name of the thread that is the destination of the message are extracted from the variable argument list (VAL). In step 902, the names are used to locate the message source thread descriptor (STD) and the message destination thread descriptor (DTD). In step 903, the command is extracted from the variable argument list. In decision step 904, it is verified whether the variable argument list contains command options and/or command arguments. If it contains command options and/or command arguments they are extracted in step 908. In step 909, the message queue id, sync_qid, is extracted from STD. If in the decision step 904, it is found that there are no options or arguments, execution proceeds to step 909. In step 910, a message is prepared using the name of message source thread, the name of message destination thread, sync_qid, the command, and if the command options and/or command arguments exist, they are included as well. In step 911, a pointer to the message is stored in STD, and execution proceeds to step 905. In step 905, the communication mode is extracted from VAL. In step 906, the routine that sends inter-thread messages is called. The arguments passed to that routine are the thread descriptor of the thread sending the message, the thread descriptor of the thread receiving the message and the communication mode. Control returns to the calling routine at step 907.

Figure 10:
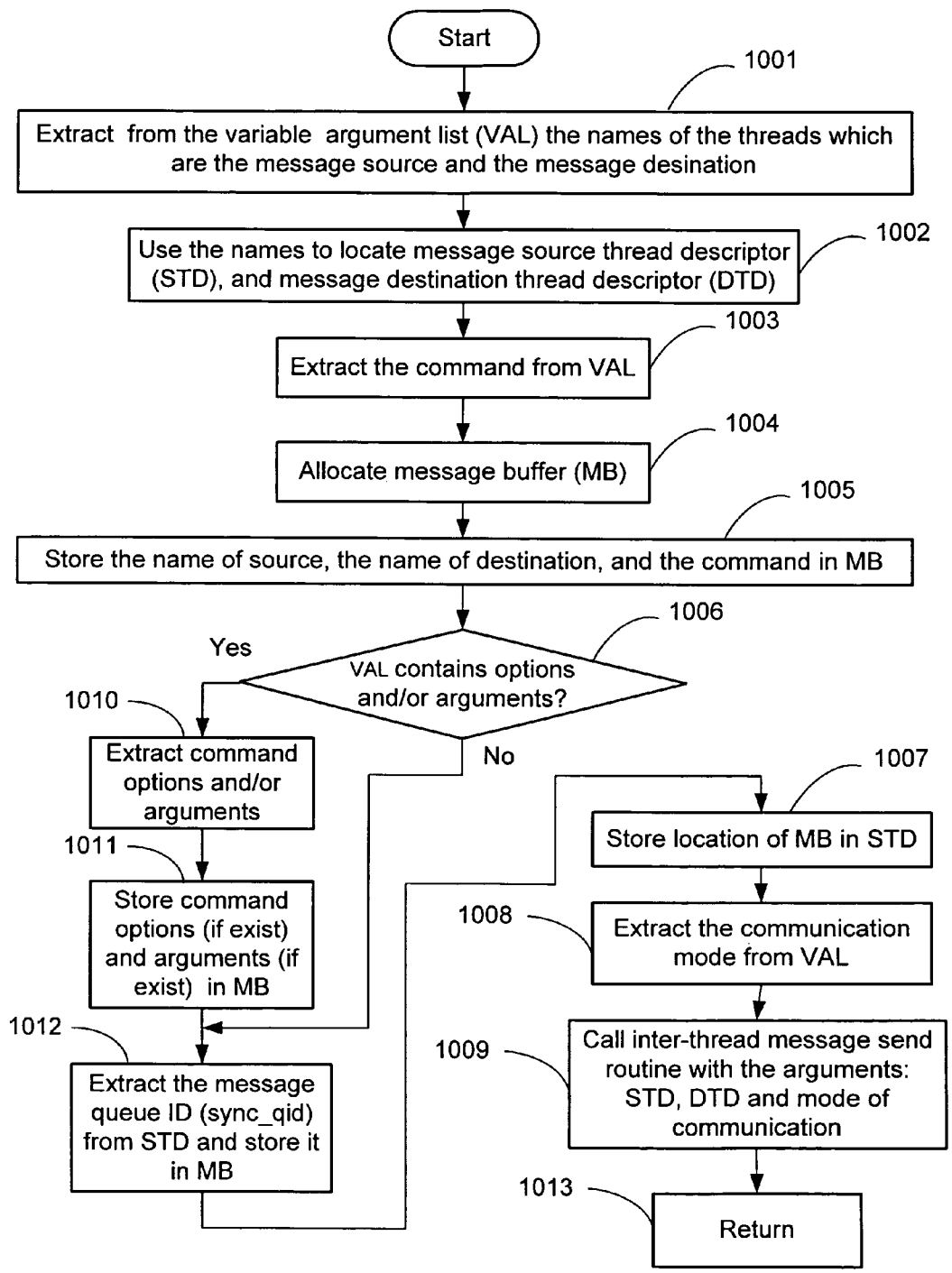
FIG. 10 is a flowchart illustrating API for buffered messages.

FIG. 10 illustrates the steps performed by the API for handling buffered messages. In step 1001, the name of the thread that is the source of the message, and the name of the thread that is the destination of the message are extracted from the variable argument list (VAL). In step 1002, the names are used to locate the message source thread descriptor (STD) and the message destination thread descriptor (DTD). In step 1003, the command is extracted from the variable argument list. In step 1004, a buffer is allocated for the message. In step 1005, the name of the message source, the name of the message destination, and the command are stored in the message buffer. In decision step 1006, it is verified whether the variable argument list contains command options and/or command arguments. If it contains command options and/or arguments, they are extracted (step 1010) and are stored in the message buffer (step 1011). In step 1012, the message queue id, sync_qid, is extracted from STD, and is stored in the message buffer. Then execution proceeds to step 1007. If in the decision step 1006, it is found that there are no options or arguments, execution proceeds to step 1012. In step 1007, the location of the message buffer is stored in the source thread descriptor. In step 1008, the communication mode is extracted from the variable argument list. In step 1009, the routine that sends inter-threads messages is called. The arguments passed to that routine are the thread descriptor of the message source, the thread descriptor of the message destination, and the communication mode. In step 1013, control returns to the calling routine.

Figure 11:
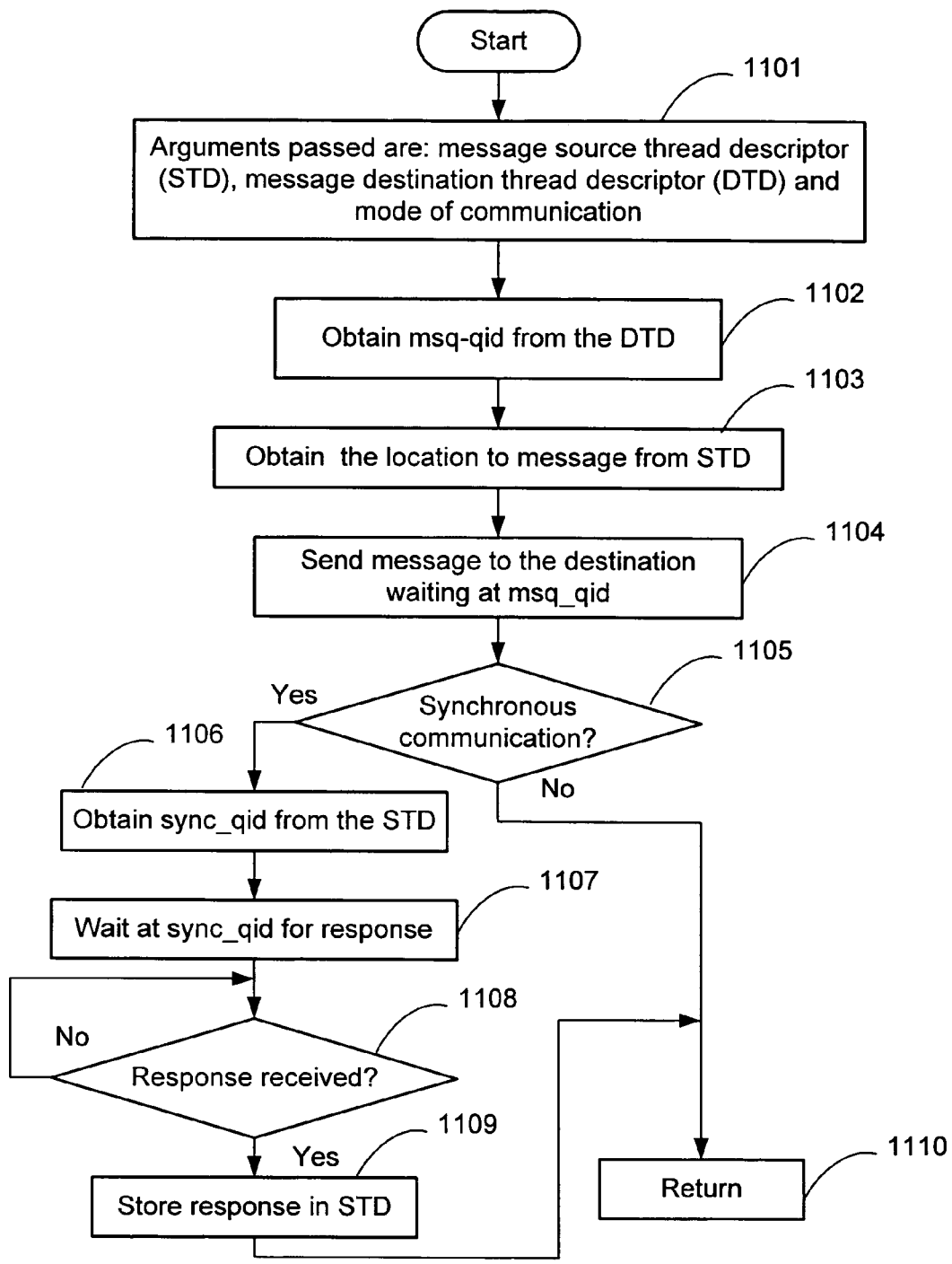
FIG. 11 is a flowchart illustrating how inter-thread messages are sent.

FIG. 11 illustrates the steps performed by the routine that sends inter-thread messages. The APIs that handle buffered and unbuffered messages call this routine. The arguments passed to this routine are: the message source thread descriptor, the message destination thread descriptor, and the mode of communication (step 1101). In step 1102, the message queue ID (msg_qid) of the destination of the message is obtained from the destination thread descriptor (DTD). In step 1103, the location of the message is obtained from the source thread descriptor (STD). In step 1104, the message is sent to the destination thread waiting at msg_qid. In the decision step 1105, the mode of communication is examined. If the mode of communication is synchronous, the sync_qid is obtained from the thread descriptor of the source (step 1106). At step 1107, the routine waits for a response at sync_qid. If at decision step 1108 no response is received, the routine continues waiting. If a response is received, the response is stored in the source thread descriptor (step 1109), to make it accessible to the thread that sends the message. After that, control returns to the calling routine (step 1110). In the decision step 1105, if the mode of communication is asynchronous, the routine proceeds to step 1110.

Figure 12:
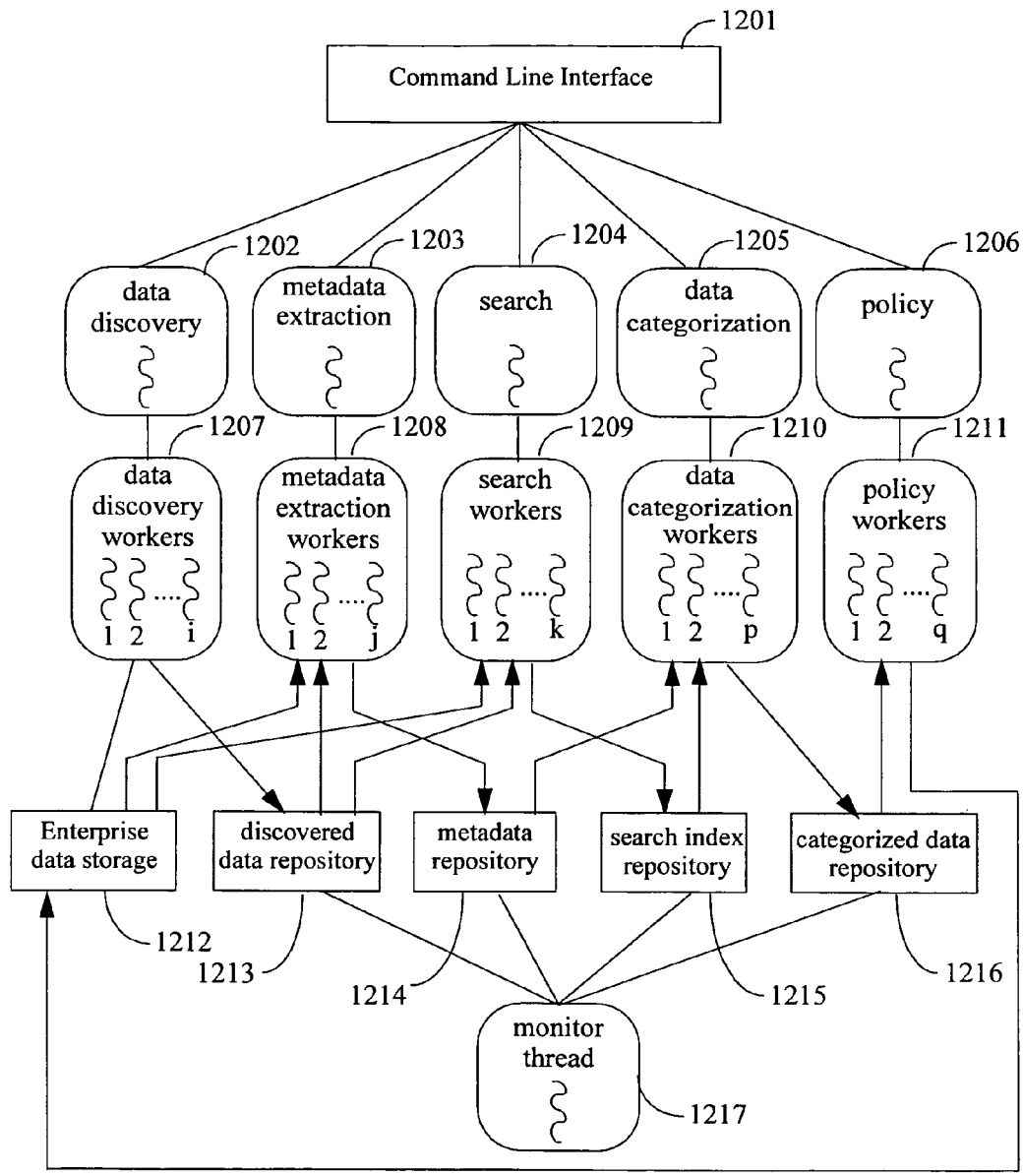
FIG. 12 is a block diagram of an embodiment of the invention for enterprise data management.

FIG. 12 illustrates an embodiment for enterprise data management system. Data managed is stored in devices connected to an enterprise network. Enterprise data management is divided into tasks. The tasks are data discovery, metadata extraction, full text search, data categorization, and applying management policies to categorized data. The tasks are allocated to different threads, and the threads are allocated to different cores or different groups of cores in a multi-core system, or to different processors in a multi-processor system, so as to run programs in parallel. Configuration information about the threads is included in a configuration file (102 in FIG. 1). A policy is one or a set of actions, for instance deleting all documents that were created before a specific date, or renaming all documents that contain the term "confidential", and moving the documents from one location to another. The command line interface (1201) is a mechanism for interacting with software by typing commands to perform tasks related to enterprise data management. The command line interface software waits for a user to enter a command. After the command is entered, it is formatted as a message and sent to a thread. If the command requests multiple tasks, multiple messages are formatted and sent to different threads. FIG. 12 includes threads and workers threads. The threads are: data discovery thread (1202), metadata extraction thread (1203), search thread (1204), data categorization thread (1205), and policy thread (1206). The data discovery thread (1202) creates data discovery worker thread 1, data discovery worker thread 2, . . . , and data discovery worker thread i (1207). The metadata extraction thread (1203) creates metadata extraction worker thread 1, metadata extraction worker thread 2, . . . , and metadata extraction worker thread j (1208). The search thread (1204) creates search worker thread 1, search worker thread 2, . . . , and search worker thread k (1209). The data categorization thread (1205) creates data categorization worker thread 1, data categorization worker thread 2, . . . , and data categorization worker thread p (1210). The policy thread (1206) creates policy worker thread 1, policy worker thread 2, . . . , and policy worker thread q (1211). Each worker thread is assigned a different task, or a set of different tasks. The workers execute programs in parallel. The enterprise data storage (1212) represents data stored in an enterprise network. The diagram includes four data repositories: discovered data repository (1213), metadata repository (1214), search index repository (1215), and categorized data repository (1216). The monitor thread (1217) accesses the four repositories to monitor availability of predetermined amounts of data in each repository. When there is predetermined amounts of data, the monitor thread (1217) alerts threads responsible for processing the data about data availability.

Data discovery workers (1207) scan Internet Protocol ports in an enterprise network to determine services, and storage devices available in the network. In one implementation file systems that exist in the enterprise data storage 1212 are discovered. The names of file systems and their locations are stored in discovered data repository (1213). Metadata extraction worker threads (1208) access the discovered data repository (1213) to obtain the names of the file systems and their locations. They then access the enterprise data storage (1212), read documents that exist in the file systems and extract their metadata. For each document, the metadata extraction worker threads (1208) store the name of the document, its location and its metadata in the metadata repository (1214). The search worker threads (1209) access the discovered data repository (1213) to obtain the names of the file systems and their locations. They then access the enterprise data storage (1212), read documents that exist in the file systems, generate a search index for the documents, and store the search index in the search index repository (1215). The search index includes names and locations of the documents.

The data categorization workers (1210) access the metadata repository (1214) and the search index repository (1215) to categorize the data. Data categorization methods group documents according to information extracted from their metadata. They also group documents based on results obtained by full text search using the search index stored in the search index repository (1215). Each group of documents is given a name, sometimes referred to as a tag. Each group includes the names and the locations of documents. The categorization workers store the result of categorization in the categorized data repository (1216). Policy workers (1211) apply a data management policy, or a number of policies to the categorized data. They access categorized data repository (1216) and obtain the names and locations of documents that are members of a category to which a policy or policies are to be applied. Then the policy workers access the documents in the enterprise data storage (1212) and apply the policy, or policies to each document.

In FIG. 12, using the command line interface, a user interacts with the data discovery thread (1202), the metadata extraction thread (1203), the search thread (1204), the data categorization thread (1205), and the policy thread (1206). The first activity to be started is the data discovery. In one implementation, the data discovery thread (1202) divides the network into segments and distributes workload between the data discovery worker threads, by assigning to each worker thread the task of data discovery in a different segment or segments. The monitor thread (1217) monitors availability of data in the discovered data repository (1213). When a predetermined amount of data is discovered, the monitor thread (1217) alerts the metadata extraction thread (1203) and the search thread (1204) to start metadata extraction and building of search index. The metadata extraction thread (1203) distributes workload between the metadata extraction worker threads (1208) to extract metadata in parallel and store the result in the metadata repository (1214). The search thread (1204) distributes workload between the search worker threads (1209) to run programs in parallel to generate and store search index data in the search index repository (1215).

After completion of metadata extraction and the building of the search index, data categorization can be started. Using the command line interface (1201), a user can enter a command, or a set of commands, to categorize data. When the data categorization thread (1205) receives a command, it distributes workload between the data categorization worker threads (1210). The data categorization worker threads run programs to categorize data in parallel. They use the data stored in the metadata repository (1214) and the search index repository (1215) in order to categorize data. They store the result in the categorized data repository (1216). If a user entered a command to execute a policy on categories of data, the policy thread (1206) distributes workload between the policy worker threads (1211). The policy worker threads access the categorized data repository (1216), obtain the names and locations of the documents that belong to a category, access the documents in the enterprise storage (1212), and execute a policy.

Instead of entering separate commands for categorization and execution of policy, a user may enter one command to do both. For instance, a command could request finding documents that contain certain terms and deleting them. In this case, the monitor thread (1217) monitors the categorized data repository (1216), and when amount of data reaches a predetermined value, it alerts the policy thread (1206) to start applying policies. This enables both categorization threads and policy threads to execute programs simultaneously in parallel. According to another implementation of enterprise data management, categorization starts before metadata extraction and the building of the search index are completed for all enterprise documents. In the implementation, data discovery, metadata extraction, search, data categorization, and policy threads run at the same time executing programs in parallel. In another implementation of the enterprise data management the data discovery thread is not used. The location of enterprise data is entered manually.

The present invention allows spreading the workload across multiple threads and allocates threads to different cores or groups of cores in a multi-core system, or to different processors in a multi-processor system so as to run programs in parallel.

In the present invention the configuration file contains, in one place, information about tasks allocated to threads and worker threads, thread affinity, and threads priorities. This makes it possible, in one place, to tune the system to increase performance by modifying the number of threads and worker threads, readjusting allocation of tasks to threads, readjusting allocation of threads to cores or processors, and modifying threads priorities.

In one aspect of the invention, at first, the thread affinity in the configuration file is set such that all threads use the operating system built-in thread affinity. The system is started and the behavior of the system is analyzed to find out the threads that need to be moved from one core to another or from one processor another, so as to increase performance. The system is stopped; the affinity of threads that are to be moved is modified in the configuration file, so that they no longer use the operating system built-in thread affinity. Their affinity is set so that they run in cores, groups of cores, or processors other than the ones that would have been specified by the operating system. After that, the system is restarted. This process is repeated until an optimal performance is attained. Different operating systems have different implementation of the built-in thread affinity. As a consequence, the behavior of an application running under different operating systems is not the same. For this reason, for each operating system, the system is run at first using that operating system built-in thread affinity to gain understanding of how programs are executed. The longer the system is run the better, as over time the behavior of programs could be unpredictable. Though the operating system built-in affinity may work as expected at first, performance may drop over time due to changes in program behavior. Running an application using operating system built-in thread affinity may uncover undesirable behavior that could be corrected by moving threads from one processor to another, or from one core to another.

In another aspect of the invention the thread affinity in the configuration file is set such that some threads use the operating system built-in thread affinity. The rest of the threads are configured not to use the operating system built-in thread affinity. Each of those threads has its affinity set so that it runs on a specific core or a specific group of cores in a multi-core system, or on a specific processor in a multi-processor system.

In another aspect of the invention the thread affinity in the configuration file is set such that all threads are allocated to different cores or groups of cores in a multi-core system, or to different processors in a multi-processor system, without using an operating system built-in thread affinity.

According to another implementation of the invention, sockets are used for inter-thread communication instead of message queues. One socket is used to receive incoming messages and another socket is used to receive responses after sending synchronous messages.

According to another implementation of the invention, shared memory is used for inter-thread communication. One shared memory is used for sending messages, and another is used for receiving responses during synchronous communication.

According to another implementation of the invention, in addition to data stored in file systems, data discovered and managed includes data stored in databases, intranets, data archives, and email servers.

According to another implementation of the invention, a graphical user interface is used in addition to the command line interface.

According to another implementation of the invention, when the computational intensity of a data management task is low, the thread to which the task is assigned handles that task on its own. It does not create worker threads.

In another aspect of the invention, threads to which data management tasks are assigned, handle all data management workload on their own, and no worker threads are created in the system.

According to another implementation of the invention, a pool of one or more worker threads is created and the pool is shared between many threads performing data management.

According to another implementation of the invention, a parse-tree is used for parsing commands received by threads.

In another embodiment of the invention, APIs that have fixed number of arguments replace the two APIs for inter-thread communication.

According to another implementation of the invention, new threads are created, while the system is running, to perform data management tasks not performed by existing threads. The new threads have the same structure as the threads that are created during initialization. They have hash tables, message queue IDs, create workers, and are included in the thread descriptor array.

In another embodiment the invention is run in a single-processor system to take advantage of the less resources used by threads compared to processes and the faster switching between threads.

In another embodiment the invention is run in an SMP system

In another embodiment of the invention, processes are created instead of the threads created during initialization. Like the threads created during initialization, the processes exchange messages, have hash tables, and create worker threads. The processes act the same way as the threads they replace.

CONCLUSION, RAMIFICATION, AND SCOPE

Accordingly, the reader will see that the present invention provides a multi-threaded, multi-core aware, and multi-processor aware system that increases performance by distributing tasks and workload between threads and allocating threads to different cores or processors. The implementation avoids using the system calls fork( ) and exec( ) since they are slow and need a great amount of system resources. The uniform structure of threads, hash tables and inter-thread communication simplifies execution of complex projects and leads to rapid application development. The configuration file provides an overview of the threads. In one place one can tune the system to attain high performance by modifying the number of threads, readjusting allocation of tasks to threads, readjusting thread affinity, and changing the priorities of threads. In comparison, some of existing applications are not multi-core or multi-processor aware, their software is not well structured and is not designed to run in parallel.

While the above description contain several specifics, these should not be construed as limitations on the scope of the invention, but rather as examples of the some of the preferred embodiments, thereof. Many other variations are possible. Other implementation can use, instead of Unix, another operating system. Other implementations can use other command parsers instead of hash tables. The POSIX threads can be replaced by proprietary versions of threads. Other implementations can be written in a programming language other than C. If an implementation is in Java, the inter-thread communication can be based on Java RMI. An implementation can utilize Java built-in thread support and its built-in multi-threading synchronization methods. Though fork( ) and exec( ) are not used, an implementation based on this invention can, in addition to threads, use fork( ) and exec( ) to create processes to execute tasks. Some or all the threads created during system initialization can be replaced by processes, while keeping the rest of the system the same.

The invention has been described in terms of particular embodiments. Other embodiments are within the scope of the following claims. For example, steps of the invention can be performed to a different order and still achieve desirable results.

What is claimed is:

1. A multi-threaded system for data management comprising:
   one or more threads;
   means for exchanging messages between said threads, said messages including commands performing data management to be executed by said threads, each of said threads including a method for parsing said commands and executing programs corresponding to said commands;
   means for exchanging said messages by one or more inter-thread communication methods;
   means for sending said messages by synchronous and asynchronous communication methods;
   means for dividing data management into tasks and assigning tasks to said threads;
   means for causing each of said threads to create one or more worker threads, and to divide data management workload of each of said threads between said worker threads;

a configuration file including configuration information for said threads and said worker threads;

means for creating said threads and said worker threads using said configuration information; and means for assigning said threads and said worker threads to different cores in a multi-core system so that programs are executed in parallel.

2. The system of claim 1, wherein said configuration file including thread affinity for said threads and said worker threads, and means to set said thread affinity to cause each of said threads to run on a specific core in a multi-core system, and means to set said thread affinity to cause each of said worker threads to run on a specific core in a multi-core system, wherein different said threads and different said worker threads running on different cores at the same time so that data management programs are executed in parallel.

3. The system of claim 2, wherein said thread affinity is set to cause each of said threads to run on a group of cores in a multi-core system, and means to set said thread affinity to cause each of said worker threads to run on a group of cores in a multi-core system, wherein different said threads and different said worker threads running on different groups of cores at the same time so that data management programs are executed in parallel.

4. The system of claim 2, wherein said thread affinity is set to cause each of said threads to run on a specific processor in a multi-processor system, and wherein said thread affinity is set to cause each of said worker threads to run on a specific processor in a multi-processor system, wherein different said threads and different said worker threads running in different processors at the same time so that data management programs are executed in parallel.

5. The system of claim 2, wherein said thread affinity is set to cause one or more said threads and one or more said worker threads to use an operating system built-in thread affinity.

6. The system of claim 1, wherein said method for parsing said commands and executing said programs comprising a hash table mapping said commands to said programs.

7. The system of claim 1, wherein a message further comprising:
means to identify a thread sending said message;
means to identify a thread receiving said message;
a command executed by said thread receiving said message; and
a place where said thread sending said message waits for a response from said thread receiving said message during synchronous communication.

8. The system of claim 7, wherein each of said threads has a name, and said name identifying each of said threads.

9. The system of claim 1, further comprising computer program instructions operable to be executed to cause the system to perform computationally intensive applications by running threads in parallel.

10. The system of claim 1, further comprising computer program instructions operable to be executed to cause the system to perform enterprise data management, said enterprise data management including data discovery, metadata extraction, full text search, data categorization, and policy management.

11. The system of claim 10, further comprising:
means for creating: a data discovery thread, a metadata extraction thread, a search thread, a data categorization thread and a policy thread;
means for dividing said data discovery into data discovery tasks, and methods to assign said data discovery tasks to said data discovery thread;
means for dividing said metadata extraction into metadata extraction tasks, and methods to assign said metadata extraction tasks to said metadata extraction thread;
means for dividing said full text search into full text search tasks, and methods to assign said full text search tasks to said search thread;
means for dividing said data categorization into data categorization tasks, and methods to assign said data categorization tasks to said data categorization thread; and
means for dividing said policy management into policy management tasks, and methods to assign said policy management tasks to said policy thread.

12. The system of claim 11, further comprising:
means to cause said data discovery thread to create one or more data discovery worker threads and distribute data discovery workload between said data discovery worker threads;
means to cause said metadata extraction thread to create one or more metadata extraction worker threads and distribute metadata extraction workload between said metadata extraction worker threads;
means to cause said search thread to create one or more search worker threads and distribute full text search workload between said search worker threads;
means to cause said data categorization thread to create one or more data categorization worker threads and distribute data categorization workload between said data categorization worker threads; and
means to cause said policy thread to create one or more policy worker threads and distribute policy management workload between said policy worker threads.

13. The system of claim 12, further comprising:
a plurality of repositories for storing data generated by enterprise data management threads;
a monitor thread; and
means to cause said monitor thread to send alerts to said enterprise data management threads when predetermined amounts of data is available in said plurality of repositories, said alerts enable said enterprise data management threads to start processing said predetermined amounts of data.

14. The system of claim 13, wherein:
said plurality of repositories comprising: discovered data repository, metadata repository, search index repository, and categorized data repository.

15. The system of claim 14, further comprising:
means to cause said data discovery thread and said data discovery worker threads to discover data in an enterprise network and store discovered data in said discovered data repository;
means to cause said monitor thread to send alerts to said metadata extraction thread when a predetermined amount of discovered data is available in said discovered data repository, wherein said metadata extraction thread and said metadata extraction worker threads comprising means to extract metadata from said discovered data, and to store said metadata in said metadata repository;
means to cause said monitor thread to send alerts to said search thread when a predetermined amount of discovered data is available in said discovered data repository, wherein said search thread and said search worker threads comprising means to build a search index of said discovered data and store said search index in said search index repository;
means to cause said monitor thread to send alerts to said data categorization thread when a predetermined amount of metadata is available in said metadata repository, wherein said data categorization thread and said data categorization worker threads comprising means to categorize data stored in said metadata repository and store categorized data in said categorized data repository;

means to cause said monitor thread to send alerts to said data categorization thread when a predetermined amount of data is available in said search index repository, wherein said data categorization thread and said data categorization worker threads comprising means to perform full text search on data stored in said search index repository, and to categorize results of said full text search, and to store categorized data in said categorized data repository; and means to cause said monitor thread to send alerts to said policy thread when a predetermined amount of data is available in said data categorization thread, wherein said policy thread and said policy worker threads comprising means applying policies to categorized data in said categorized data repository.

16. The system of claim 10, further comprising:

Means for breaking said data discovery into data discovery tasks and assign said data discovery tasks to a plurality of data discovery threads;

means for breaking said metadata extraction into metadata extraction tasks and assign said metadata extraction tasks to a plurality of metadata extraction threads;

means for breaking said full text search into full text search tasks and assign said full text search tasks to a plurality of search threads;

means for breaking said data categorization into data categorization tasks and assign said data categorization tasks to a plurality of data categorization threads;

means for breaking policy management into policy management tasks and assign said policy management tasks to a plurality of policy threads;

wherein said plurality of data discovery threads, said plurality of metadata extraction threads, said plurality of search threads, said plurality of data categorization threads and said plurality of policy threads running data management programs in parallel.

17. A multi-threaded system for data management comprising:

a plurality of threads;

means for exchanging messages between said plurality of threads, said messages including commands performing data management to be executed by said plurality of threads, each of said plurality of threads comprising a hash table including commands and corresponding executable programs, and each of said plurality of threads comprising means for parsing said commands and running said executable programs corresponding to said commands;

said plurality of threads exchanging said messages using interprocess communication (IPC) methods;

means for dividing data management into tasks and assigning different tasks to each of said plurality of threads;

means to cause each of said plurality of threads to create worker threads and to divide data management workload of each of said plurality of threads between said worker threads;

a configuration file including configuration information for creating said plurality of threads, and for creating said worker threads, and said configuration file comprising thread affinity for each of said plurality of threads, and for each of said worker threads; and means to set said thread affinity to cause each of said plurality of threads to run on a specific processing unit, and to cause each of said worker threads to run on a specific processing unit, wherein different said plurality of threads and different said worker threads running on different processing units at the same time, said processing unit is a core in a multi-core system, a group of cores in a multi-core system, and a processor in a multi-processor system.

18. The system of claim 17, further comprising computer program instructions operable to be executed to cause the system to perform enterprise data management, said enterprise data management including data discovery, metadata extraction, full text search, data categorization, and policy management.

19. The system of claim 18, comprising:

a data discovery thread and one or more data discovery worker threads, said data discovery thread comprising means to distribute data discovery workload between said data discovery worker threads;

a metadata extraction thread and one or more metadata extraction worker threads, said metadata extraction thread comprising means to distribute metadata extraction workload between said metadata extraction worker threads;

a search thread and one or more search worker threads, said search thread comprising means to distribute full text search workload between said search worker threads;

a data categorization thread and one or more data categorization worker threads, said data categorization thread comprising means to distribute data categorization workload between said data categorization worker threads;

a policy thread and one or more policy worker threads, said policy thread comprising means to distribute workload between said policy worker threads;

a plurality of repositories for storing data generated by enterprise data management threads, said plurality of repositories comprise: discovered data repository for storing data generated by said data discovery thread, and said data discovery worker threads; metadata repository for storing data generated by said metadata extraction thread, and said metadata extraction worker threads; search index repository for storing data generated by search thread, and said search worker threads; and categorized data repository for storing data generated by said data categorization thread, and said data categorization worker threads;

a monitor thread;

means to cause said monitor thread to send alerts to said plurality of threads when predetermined amounts of data is available in said plurality of repositories;

means to start processing said predetermined amounts of data when alerts are received;

wherein programs for enterprise data management run in parallel.

20. A multi-processing system for data management comprising:

one or more processes;

means for exchanging messages between said processes, said messages including commands performing data management to be executed by said processes, each process including a method for parsing said commands and executing programs corresponding to said commands;

means for exchanging said messages by one or more interprocess communication methods (IPC);

means for sending said messages by synchronous and asynchronous communication methods;

means for dividing data management into tasks and assigning different tasks to said each process;

means for causing said each process to create one or more worker threads, and to divide data management workload of said each process between said worker threads;

a configuration file including configuration information for said processes and said worker threads;

means for creating said processes and said worker threads using said configuration information;

means for assigning said processes and said worker threads to different processors in a multi-processor system, and to different cores or groups of cores in a multi-core system, so that programs are executed in parallel;

a plurality of repositories for storing data generated by said processes and said worker threads;

a monitor thread;

means to cause said monitor thread to send alerts to said processes when predetermined amounts of data is available in said plurality of repositories;

means to start processing said predetermined amounts of data when alerts are received;

wherein the system further comprising computer program instructions operable to be executed to cause the system to perform enterprise data management, said enterprise data management including data discovery, metadata extraction, full text search, data categorization, and policy management and wherein said plurality of repositories comprising discovered data repository, metadata repository search index repository and categorized data repository.

* * * * *